(12) United States Patent
Bourassa et al.

(10) Patent No.: US 9,512,780 B2
(45) Date of Patent: Dec. 6, 2016

(54) HEAT TRANSFER ASSEMBLY AND METHODS OF ASSEMBLING THE SAME

(71) Applicant: General Electric Company, Schenectady, NY (US)

(72) Inventors: Corey Bourassa, Niskayuna, NY (US); William Dwight Gerstler, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 607 days.

(21) Appl. No.: 13/955,107

(22) Filed: Jul. 31, 2013

(65) Prior Publication Data

US 2015/0033761 A1    Feb. 5, 2015

(51) Int. Cl.
*F02C 7/12* (2006.01)
*F02C 7/32* (2006.01)

(52) U.S. Cl.
CPC . *F02C 7/12* (2013.01); *F02C 7/32* (2013.01); *F05D 2260/213* (2013.01); *Y02T 50/676* (2013.01); *Y10T 29/49826* (2015.01)

(58) Field of Classification Search
CPC .......... F02C 7/12; F02C 7/32; F05D 2260/213
USPC ................................... 60/782, 785, 795, 806
See application file for complete search history.

(56) References Cited

U.S. PATENT DOCUMENTS

| | | | |
|---|---|---|---|
| 3,038,308 A | 6/1962 | Fuller et al. | |
| 3,429,122 A | 2/1969 | Pravda et al. | |
| 3,935,849 A | 2/1976 | Mills | |
| 4,258,780 A | 3/1981 | Suo | |
| 4,478,814 A | 10/1984 | Kesten et al. | |
| 4,712,610 A | 12/1987 | Kesten et al. | |
| 4,892,269 A * | 1/1990 | Greco | B64C 11/14 244/53 R |
| 4,966,229 A | 10/1990 | Senterfitt et al. | |
| 5,192,186 A | 3/1993 | Sadler | |
| 5,267,608 A | 12/1993 | Coffinberry | |
| 5,439,351 A | 8/1995 | Artt | |
| 5,581,996 A * | 12/1996 | Koch | F01D 5/141 60/266 |
| 5,782,076 A | 7/1998 | Huber et al. | |
| 5,806,298 A | 9/1998 | Klosek et al. | |

(Continued)

FOREIGN PATENT DOCUMENTS

| | | |
|---|---|---|
| GB | 2264539 A | 9/1993 |
| WO | 9744575 A1 | 11/1997 |
| WO | 2004016921 A1 | 2/2004 |

*Primary Examiner* — Steven Sutherland
(74) *Attorney, Agent, or Firm* — Robert M. McCarthy

(57) ABSTRACT

A heat transfer assembly for controlling heat transfer of a turbine engine is provided. The turbine engine includes a housing and includes a compressor, a combustor and a turbine located within the housing. The heat transfer assembly includes a flow control device having a sidewall coupled to the turbine, the sidewall is in flow communication with a compressor vane. The sidewall is configured to define a first flow path from the compressor vane to a turbine vane and a second flow path from the compressor vane to a turbine blade. A heat exchanger is coupled to the housing and located between the compressor and the turbine, wherein the heat exchanger is in flow communication with at least one of the first flow path and the second flow path. A fluid supply device is coupled to the housing and in flow communication with the heat exchanger.

19 Claims, 4 Drawing Sheets

(56) References Cited

U.S. PATENT DOCUMENTS

| | | | |
|---|---|---|---|
| 5,865,030 A | 2/1999 | Matsuhama | |
| 5,975,841 A | 11/1999 | Lindemuth et al. | |
| 6,014,855 A | 1/2000 | Page | |
| 6,295,803 B1 * | 10/2001 | Bancalari | F01D 5/18 415/114 |
| 6,422,020 B1 | 7/2002 | Rice | |
| 6,578,362 B1 | 6/2003 | Coffinberry | |
| 6,931,834 B2 | 8/2005 | Jones | |
| 6,990,797 B2 | 1/2006 | Venkataramani et al. | |
| 7,000,404 B2 * | 2/2006 | Palmisano | F01D 25/12 60/728 |
| 7,284,377 B2 | 10/2007 | Joshi et al. | |
| 7,398,642 B2 | 7/2008 | McQuiggan | |
| 7,810,332 B2 | 10/2010 | Olmes et al. | |
| 7,861,512 B2 | 1/2011 | Olver et al. | |
| 7,926,289 B2 * | 4/2011 | Lee | F01D 5/081 415/145 |
| 8,056,345 B2 | 11/2011 | Norris et al. | |
| 8,297,038 B2 | 10/2012 | Stretton | |
| 2006/0225425 A1 | 10/2006 | Kobayashi et al. | |
| 2008/0229751 A1 | 9/2008 | Orlando et al. | |
| 2008/0304958 A1 | 12/2008 | Norris et al. | |
| 2009/0133400 A1 | 5/2009 | Callas | |
| 2010/0154434 A1 * | 6/2010 | Kubota | F02C 7/18 60/785 |
| 2010/0251727 A1 * | 10/2010 | Myers | F01K 13/02 60/773 |
| 2010/0281870 A1 | 11/2010 | Holt et al. | |
| 2011/0016870 A1 | 1/2011 | Kashler | |
| 2011/0162387 A1 * | 7/2011 | Chir | F01D 5/081 60/806 |
| 2011/0271689 A1 | 11/2011 | Lacy et al. | |
| 2012/0304662 A1 | 12/2012 | Prociw et al. | |

* cited by examiner

HEAT TRANSFER ASSEMBLY AND METHODS OF ASSEMBLING THE SAME

BACKGROUND

The embodiments described herein relate generally to gas turbine engines, and more particularly, to methods and systems for cooling turbine components to improve the efficiency and/or operation of the gas turbine engine.

Typically, gas turbine engines include a compressor, a combustor, and a turbine. The compressor and turbine may include rows of blades that are axially stacked in stages. Each stage includes a row of circumferentially-spaced stator blades, which are fixed, and a row of rotor blades, which rotate about a central axis or shaft. In operation, the compressor rotor blades rotate about the shaft, and, acting in concert with the stator blades, compress a flow of air. The supply of compressed air then may be used in the combustor to combust a supply of fuel. Moreover, the resulting flow of hot gases from the combustion, i.e., the working fluid, is expanded through the turbine section of the engine. Conventionally, the flow of working fluid through the turbine induces the rotor blades to rotate. The rotor blades are connected to a central shaft such that the rotation of the rotor blades rotates the shaft for work output.

More particularly, the energy contained in the fuel may be converted into the mechanical energy of the rotating shaft, which, for example, may be used to rotate the rotor blades of the compressor, such that the supply of compressed air needed for combustion is produced, and for the coils of a generator, such that electric power is generated. During operation, because of the extreme temperatures of the hot-gas path, which may exceed 2400° F. (1316° C.), and high rotational velocities, turbine blades may be highly stressed with extreme mechanical and thermal loads. Some turbine engines may extract air from the compressor to cool components in the hot-gas path during operation. This air extraction comes at an efficiency price, however, as the usage of compressor air in this manner may decrease the efficiency of the turbine engine.

To improve gas turbine efficiency and/or reduce fuel consumption, the amount of air extracted, or bled, from the compressor should be reduced. A conventional method of minimizing bleed air may include reducing the temperature of the bleed air since less air may be required to perform the same amount of cooling. Some gas turbines may use heat exchangers that are positioned outside of the gas turbine building. External heat exchangers, however, may use hundreds of feet of piping and associate valves and supports which increase manufacturing, operational and/or maintenance costs. Moreover, some gas turbines may use blade cooling techniques such as film-holes, impingement baffles and serpentine structures. These techniques, however, may add to manufacturing, operational and/or maintenance costs.

BRIEF DESCRIPTION

In one aspect, a heat transfer assembly for controlling heat transfer of a turbine engine is provided. The turbine engine includes a housing and includes a compressor, a combustor and a turbine located within the housing. The compressor includes a compressor vane and the turbine includes a turbine vane and a turbine blade. The heat transfer assembly includes a flow control device having a sidewall coupled to the turbine and in flow communication with the compressor vane. The sidewall configured to define a first flow path from the compressor vane to the turbine vane and a second flow path from the compressor vane to the turbine blade. A heat exchanger is coupled to the housing and located between the compressor and the turbine, the heat exchanger in flow communication with at least one of the first flow path and the second flow path. A fluid supply device is coupled to the housing and includes an inlet and an outlet, the inlet and outlet coupled in flow communication to the heat exchanger and configured to direct a cooling fluid through the heat exchanger.

In another aspect, a turbine engine is provided. The turbine engine includes a compressor having an exit guide vane. The exit guide vane includes an inlet end, an outlet end and a mid-span portion located there between. A turbine is coupled to the compressor and includes a turbine vane and a turbine blade. A combustor is coupled to the compressor and the turbine. A heat transfer assembly is coupled to the compressor and the turbine. The heat transfer assembly includes a flow control device having a sidewall coupled to the turbine and in flow communication with the compressor vane. The sidewall configured to define a first flow path from the compressor vane to the turbine vane and a second flow path from the compressor vane to the turbine blade. A heat exchanger is coupled to the housing and located between the compressor and turbine, the heat exchanger in flow communication with the exit guide vane and at least one of the first flow path and the second flow path.

In a further aspect, a method of assembling a heat transfer assembly to a turbine engine having a compressor and a turbine is provided. The method includes coupling a flow control device to the turbine. A sidewall of the flow control device is coupled in flow communication to a compressor vane of the compressor and a turbine vane of the turbine. The method further includes forming a first flow path between the combustor and the sidewall and forming a second flow path between the sidewall and the housing. The method includes coupling a heat exchanger to the housing and located between the compressor and turbine.

DRAWINGS

These and other features, aspects, and advantages will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein relate to gas turbine engines and methods of assembling heat transfer assemblies to gas turbine engines. More particularly, the embodiments relate to a heat transfer assembly located within the gas turbine engine and coupled to a compressor and a turbine of the gas turbine engine. The embodiments relate to methods, systems and/or apparatus for cooling turbine components during operation to facilitate improvement of engine performance. It should be understood that the embodiments described herein include a variety of types of gas and/or combustion and/or rotary engines including aircraft engines and power generating engines, and further understood that the descriptions and figures that utilize airflow are exemplary only.

Figure 1:
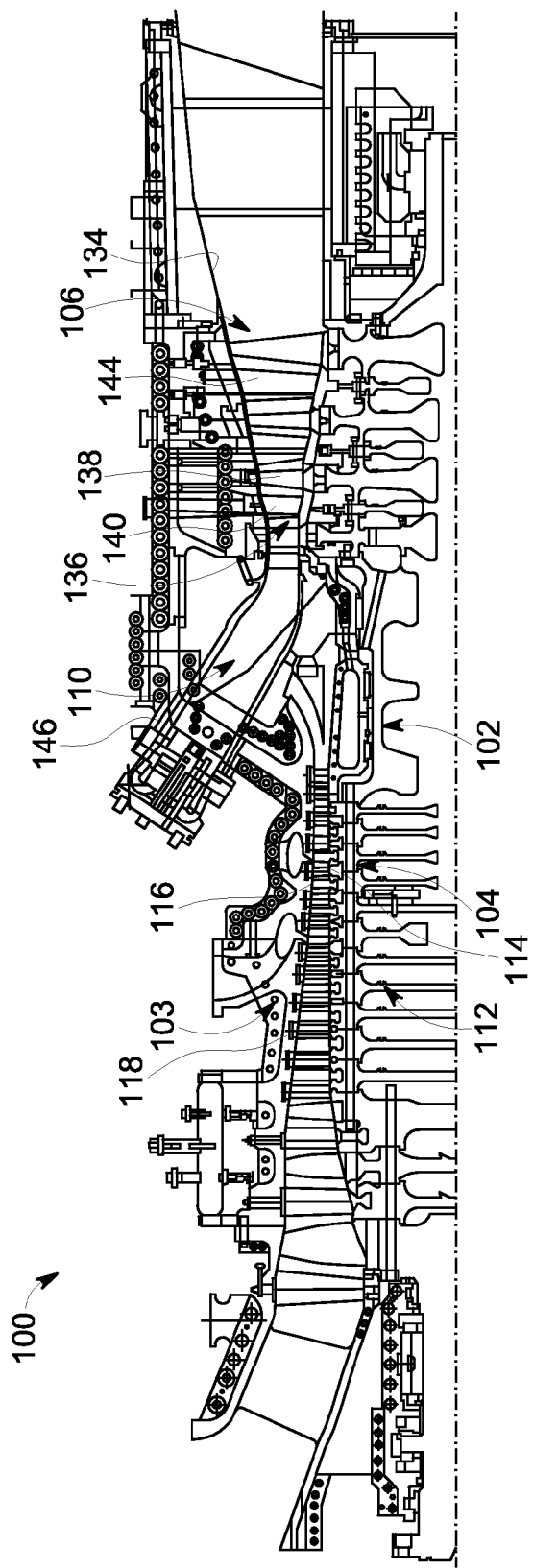
FIG. 1 is a side elevational view of an exemplary gas turbine engine.
Figure 2:
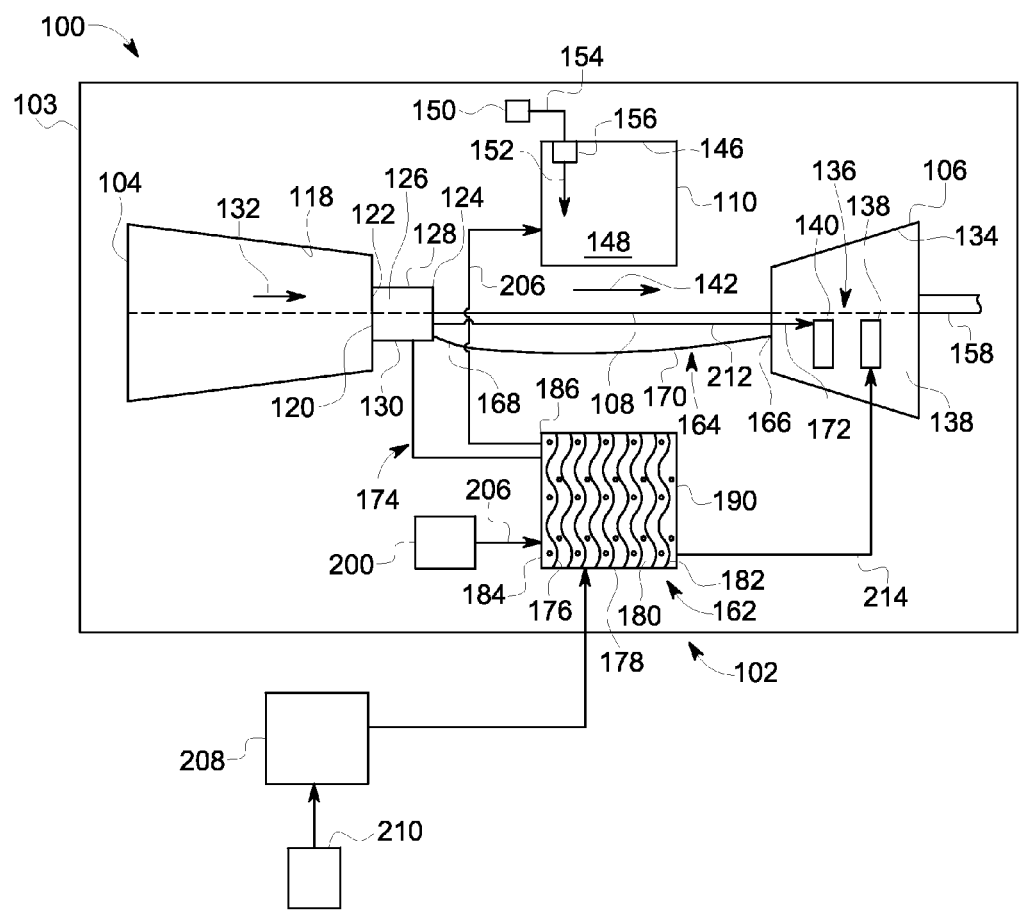
FIG. 2 is a schematic view of the gas turbine engine shown in FIG. 1 and an exemplary heat transfer assembly coupled to the gas turbine engine.
Figure 3:
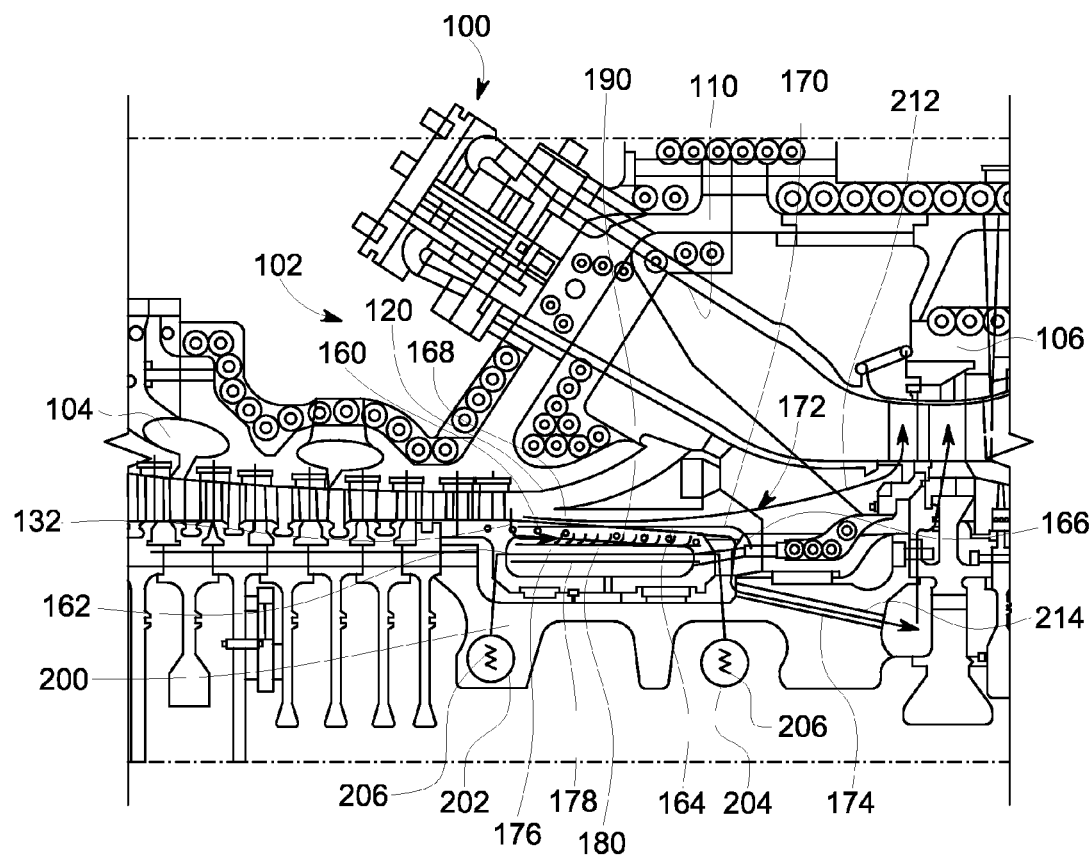
FIG. 3 is a side elevational view of an exemplary heat transfer assembly coupled to the gas turbine engine shown in FIG. 1.

FIG. 1 is a side elevational view of a gas turbine engine 100. FIG. 2 is a schematic view of gas turbine engine 100 and a heat transfer assembly 102 coupled to gas turbine engine 100. FIG. 3 is a side elevational view of an exemplary heat transfer assembly 102 coupled to the gas turbine engine 100. Engine 100 includes a housing 103 and a compressor 104 coupled to a turbine 106 by a common shaft 108, Compressor 104 and turbine 106 are located within housing 103. Engine 100 further includes a combustor 110 coupled to compressor 104 and turbine 106. In the exemplary embodiment, compressor 104 includes a plurality of stages 112. Each stage 112 includes a row of compressor rotor blades 114 which rotate about shaft 108, followed by a row of compressor stator blades 116, which remain stationary during operation. Compressor rotor blades 114 are configured such that, when spun about the shaft 108, compressor rotor blades 114 impart kinetic energy to the air flowing through compressor 104. Compressor 104 may include any number of stages 112 to enable engine 100 to function as described herein.

Compressor 104 further includes a compressor housing 118 and a compressor vane 120, such as, but not limited to, an exit guide vane, coupled to compressor housing 118. Exit guide vane 120 includes an inlet end 122, an outlet end 124 and a mid-span portion 126 located there between. Moreover, exit guide vane 120 includes a pair of opposing end walls 128 and 130 that are coupled to and extending between inlet end 122 and outlet end 124. In the exemplary embodiment, mid-span portion 126 is located between end walls 128 and 130. Exit guide vane 120 is configured in flow communication with compressor blades 114, 116 and is configured to receive a compressed air flow 132 from compressor blades 114, 116.

Turbine 106 includes a turbine housing 134 which includes a first stage 136 having a blade 138 and a vane 140. Blade 138 is configured to rotate about shaft 108 during operation, while vane 140 remains stationary during operation. Blades 136 are circumferentially spaced one from the other and fixed about an axis of rotation of shaft 108. Blades 136 are coupled to a turbine wheel (not shown) for rotation about shaft 108. In the exemplary embodiment, blades 136 and vanes 140 lie in a hot gas path 142 of engine 100. Turbine 106 further includes a second stage 144. Second stage 144 similarly includes a plurality of circumferentially spaced vanes 140 followed by a plurality of circumferentially spaced blades 138. Blades 138 are mounted on turbine wheel (not shown) for rotation. Turbine 106 may include any number of stages, vanes and/or blades to enable engine 100 to function as described herein.

Combustor 110 includes a combustor housing 146 coupled to compressor housing 118 and turbine housing 134. Combustor housing 146 defines a combustion chamber 148 in flow communication with compressor 104 and turbine 106. A fuel source 150 supplies a fuel 152 through supply lines 154 to an igniter 156. Supply lines 154 are configured to discharge fuel 152 into chamber 148 such that fuel 152 mixes with compressed air flow 132. Igniter 156 is configured to combust the mix of air flow 132 and fuel 152. In chamber 148, energy is released when compressed air flow 132 is mixed with fuel 152 and ignited. The resulting flow of hot gases from combustor 110, which may be referred to as the working fluid (not shown), is then directed over turbine blades 138, the flow of working fluid inducing the rotation of turbine blades 138. Thereby, the energy of the flow of working fluid is transformed into the mechanical energy of rotating blades 136 and, because of the connection between blades 138 and shaft 108, results in shaft rotation. The mechanical energy of shaft 108 may then be used to drive the rotation of compressor blades 114, such that the necessary supply of compressed air is 132 produced, and also, for example, a generator (not shown) to produce electricity.

In the exemplary embodiment, heat transfer assembly 102 includes a flow control device 160 and a heat exchanger 162. Flow control device 160 includes a sidewall 164 coupled to turbine 106 and in flow communication with exit guide vane 120. Sidewall 164 includes a first end 166, a second end 168 and body 170 coupled to and located between first end 166 and second end 168. First end 166 is coupled to turbine housing 134 and second end 168 is spaced from outlet end 124 of exit guide vane 120. In the exemplary embodiment, body 170 is located with an area defined by compressor housing 118, turbine housing 134 and combustor housing 146. Sidewall 164 is configured to define a first flow path 172 from compressor 104 to turbine 106. More particularly, first flow path 172 is defined from exit guide vane 120 to turbine vane 140 such that first flow path 172 is in flow communication with exit guide vane 120 and turbine vane 140. In the exemplary embodiment, body 170 is configured to facilitate directing air flow 132 from outlet end 124, along first flow path 172 and in flow communication with turbine vane 140.

Sidewall 164 is configured to define a second flow path 174 from compressor 104 to turbine 106. More particularly, second flow path 174 is defined from exit guide vane 120 to turbine blade 138. Second flow path 174 is in flow communication with exit guide vane 120 and turbine blade 138. In the exemplary embodiment, body 170 is configured to facilitate directing air flow 132 from outlet end 124, along second flow path 174 and in flow communication with turbine blade 138. In the exemplary embodiment, sidewall 164 is configured to isolate first flow path 172 from second flow path 174. Alternatively, sidewall 164 is configured for flow communication between first flow path 172 and second flow path 174.

In the exemplary embodiment, heat exchanger 162 is coupled to housing 103 and located between compressor 104 and turbine 106. More particularly heat exchanger 162 is coupled to housing 103 and inboard of combustor 110, and sidewall 164 is located between combustor 110 and heat exchanger 162. Heat exchanger 162 is coupled to housing and is in flow communication with exit guide vane 120 and with at least one of first flow path 172 and second flow path 174. In the exemplary embodiment, heat exchanger 162 is located within second flow path 174. Alternatively, heat exchanger 162 is located within first flow path 172. Heat exchanger 162 includes a compact, surface cooler configuration that is sized and shaped to facilitate integration within gas turbine engine 100 and inboard of combustor 110. Moreover, heat exchanger 162 is sized and shaped to reduce and/or eliminate additional piping and associated components to direct air flow from compressor 110 to heat exchanger 162. Alternatively, heat exchanger 162 is located within gas turbine engine 100 outboard of combustor 110. Heat exchanger 162 may be located within gas turbine engine 100 in any location to enable heat transfer assembly 102 to function as described herein.

Heat exchanger 162 includes a first plate 176, a second plate 178 and at least one flow channel 180 coupled to and between first plate 176 and second plate 178. Channel 180 includes an entry end 184 and an exit end 186. In the exemplary embodiment, flow channel 180 includes a plurality of walls 182 located in a serpentine configuration between first plate 176 and second plate 178. Alternatively, flow channel 180 may include a non-serpentine configuration. In an alternate embodiment, flow channel 180 includes a plurality of tubes (not shown) coupled to first plate 176 and second plate 178. Flow channel 180 may include any configuration to enable heat exchanger 162 to function as described herein.

Heat exchanger 162 further includes a plurality of heat fins 190 coupled to first plate 176 and extending into second flow channel 180. Heat fins 190 are sized and shaped to increase surface area of first plate 176 exposed within second flow channel 180. Alternatively, the plurality of heat fins 190 may couple to second plate 178. Heat exchanger 162 includes a material composition to withstand high temperatures such as, for example, a temperature of about 1000° F. In the exemplary embodiment, heat exchanger 162 includes a nickel alloy. Alternatively, heat exchanger 162 may include any material composition to enable heat exchanger 162 to withstand any operating temperatures of gas turbine engine 100.

Heat transfer assembly 102 further includes a fluid supply device 200 coupled to housing 103. Fluid supply device 200 includes an inlet 202 and an outlet 204. Inlet 202 is coupled in flow communication to entry end 184 and outlet 204 is coupled in flow communication to exit end 186. Moreover, outlet 204 is coupled in flow communication to combustor 110. Fluid supply device 200 is configured to direct a cooling fluid 206 from inlet 202, through channel 180 and beyond outlet 204. Exit end 186 is configured to direct cooling fluid 216 into combustor 110 as described herein.

Heat exchanger 162 assembly further includes a controller 208 coupled to heat transfer assembly 102. Controller 208 is configured to control the settings of heat transfer assembly 102 such that these settings may be achieved by a system operator for desired performance of turbine engine 100. Controller 208 is configured to perform a plurality of functions including, for example, fuel, air and emissions control, sequencing of turbine fuel and auxiliary for start-up, shut-down and cool-down, synchronization and voltage matching of engine 100, monitoring of all turbine, control and auxiliary functions, monitoring of all turbine operating parameters 210, protection against unsafe and adverse operating conditions, and/or other similar functions.

Controller 208 includes a processor, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processors, as described herein, process information transmitted from a plurality of electrical and electronic devices. Memory devices (not shown) and storage devices (not shown) store and transfer information and instructions to be executed by the processors. Memory devices and the storage devices may also be used to store and provide temporary variables, static (i.e., non-volatile and non-changing) information and instructions, or other intermediate information to processor during execution of instructions by the processors. The execution of sequences of instructions is not limited to any specific combination of hardware circuitry and software instructions.

In the exemplary embodiment, controller 208 includes a standard package, such as, without limitation, a gas turbine digital engine control (GT DEC) system and/or a prognosis and health monitoring (PHM) system. Controller 208 includes sufficient memory and processing resources to enable operation of gas turbine engine 100 as described herein, such memory and processing resources are described above. The processing resources and memory resources form an integrated, unitary architecture that executes all algorithms and control logic and generates and transmits all data output to controller 208. Therefore, in the exemplary embodiment, only minor modifications to the architecture and programming of controller 208 to accommodate processor and data transmitted therefrom are necessary. Alternatively, controller 208 may include the architecture and programming necessary to execute the functions of the processors, thereby rendering processors unnecessary.

Controller 208 is further configured to provide active modulation of extraction of bleed air and/or cooling fluid during operation by controlling heat transfer assembly 102. More particularly, controller 208 is configured to control heat transfer assembly 102 in response to one or more measured or calculated engine operating parameters 210 relating to the various components of turbine engine 100. In the exemplary embodiment, one or more operating parameters 210 relating to turbine engine 100 may be measured by controller 208 via sensors (not shown) disposed in one or more locations in turbine engine 100. Sensors may be placed throughout the various components and/or stages of turbine engine 100, including compressor, combustor, turbine, and heat transfer assembly 102, and may transmit information to controller 208 as necessary. Sensors may take measurements relating to valve positions, temperature, pressure, and other such measurements, sensors may be used in closed loop control systems. Controller 208 is configured to monitor and record the measured information from sensors and use the obtained data from sensors to make calculations relating to operating parameters 210 that were not measured by a sensor, such as, for example, fire temperature. These calculations may be based on conventional model-based control systems or other similar methods.

In the exemplary embodiment, the operating parameters 210 measured, monitored, and recorded by controller 208 include, but are not limited to: turbine exhaust temperature and/or pressure, compressor airflow, compressor inlet temperature, compressor outlet temperatures, compressor inlet pressure, compressor outlet pressure, fuel flow, combustion dynamics, distribution and intake air-flow. Controller 208 is configured to calculate, monitor, and record one or more operating parameters 210 (e.g., combustor exit temperature, turbine reference temperature, turbine firing, temperature, etc.) based on measured engine operating parameters 210. Controller 208 facilitates adjusting heat transfer assembly 102 pursuant to any and all of these measured, monitored, recorded, and/or calculated engine operating parameters 210 (i.e., data concerning how the engine 100 is operating and the conditions under which it operates).

During an exemplary operation, ambient air, drawn into compressor 104, is compressed and channeled downstream to combustor 110. Air is mixed with fuel 152, and the mixture is ignited by combustor 110 to generate high temperature combustion gases. The combustion gases are channeled from combustor 110 to drive turbine 106. Exit guide vane 120 is configured to extract and/or bleed compressed air flow 132 from compressor blades 114 (shown in FIG. 1). More particularly, rotation of compressor blades 114 (shown in FIG. 1) within compressor 104 compresses air flow 132 and discharges air flow 132 to exit guide vane 120. Inlet end 122 is configured to receive compressed air flow 132 and direct toward mid-span portion 126. Air flow 132 flows through mid-span portion 126 and discharges out of outlet end 124. Heat transfer assembly 102 is configured to receive air flow 132 to facilitate cooling at least one of turbine blade 138 and turbine vane 140. More particularly, sidewall 164 is configured to direct a first air flow 212 of air flow 132 into first flow path 172. Moreover, sidewall 164 is configured to direct a second air flow 214 of air flow 132 into second flow path 174. First flow path 172 is configured to direct first air flow 212 between combustor housing 146 and sidewall 164 and in flow communication with turbine vane 140. First air flow 212 is configured to facilitate cooling turbine vane 140. In the exemplary embodiment, first flow path 172 is sized and shaped to locally diffuse first air flow 212 to facilitate increasing local static pressure beyond exit guide vane 120 to provide sufficient pressure within first flow path 172 for cooling turbine vane 140. More particularly, first air flow 212 includes a higher pressure than a pressure of hot gas path 142.

Second flow path 174 is configured to direct second air flow 214 in flow communication with heat exchanger 162. More particularly, second air flow 214 is directed in flow communication with the plurality of heat fins 190. Fluid supply device 200 is configured to discharge cooling fluid 206 from inlet 202 and into channel 180. Cooling fluid 206 flows through channel 180 for removing energy extracted from second air flow path 174. More specifically, in the exemplary embodiment, cooling fluid 206 is circulated through serpentine pattern of channel 180. In one embodiment, cooling fluid 206 is air, and heat exchanger 162 is an air-to-air heat exchanger 162. In another embodiment, cooling fluid 206 is water, and heat exchanger 162 is an air-to-water heat exchanger 162. Heat exchanger 162 extracts heat energy from compressed second air flow 214 and transfers the heat energy into cooling fluid 206. Heat is transferred from second air flow 214 through walls 182 to cooling fluid 206. Heat fins 190 are configured to increase surface contact area of second air flow 214 within second flow path 174 to facilitate enhancing heat transfer from second air flow 214 to cooling fluid 206. Accordingly, heat exchanger 162 facilitates rejecting heat between compressor 104 and turbine 106 while cooling air flow 214 that is flowing within second flow path 174 and beyond heat exchanger 162.

Second flow path 174 is configured to direct second air flow 214 beyond heat exchanger 162 and in flow communication with turbine blade, 138. Second air flow 214 is configured to facilitate cooling turbine blade 138. In the exemplary embodiment, second flow path 174 is sized and shaped to locally diffuse second air flow 214 to facilitate increasing local static pressure beyond exit guide vane 120 to provide sufficient pressure within second flow path 174 for cooling turbine blade 138. More particularly, second air flow 214 includes a higher pressure than a pressure of hot gas path 142.

In the exemplary embodiment, outlet 204 directs heated cooling fluid 206 into combustor 110. In one exemplary embodiment, cooling fluid 206 includes water which when injected into combustor 110 facilitates reducing nitrogen oxide (NOx) emissions emitted by gas turbine engine 100. In another exemplary embodiment, cooling fluid 206 includes a fuel flowing through heat exchanger 162 for removing energy extracted from second flow path 174. Fuel 206, at ambient temperature, is channeled from inlet 202 to heat exchanger 162. Hot second air flow 214 is passed over heat exchanger 162 thereby cooling second air flow 214 and heating fuel 206 to a temperature that is greater than ambient temperature. Heated fuel 206 is then channeled from outlet 202 and injected into combustor 110. The energy absorbed through heat transfer between second flow path 174 and fuel 206 facilitates reducing gas turbine fuel consumption by increasing the efficiency of fuel 206 prior to injecting fuel 206 into annular combustor 110 thereby resulting in a higher net operating efficiency of as engine turbine 100.

Figure 4:
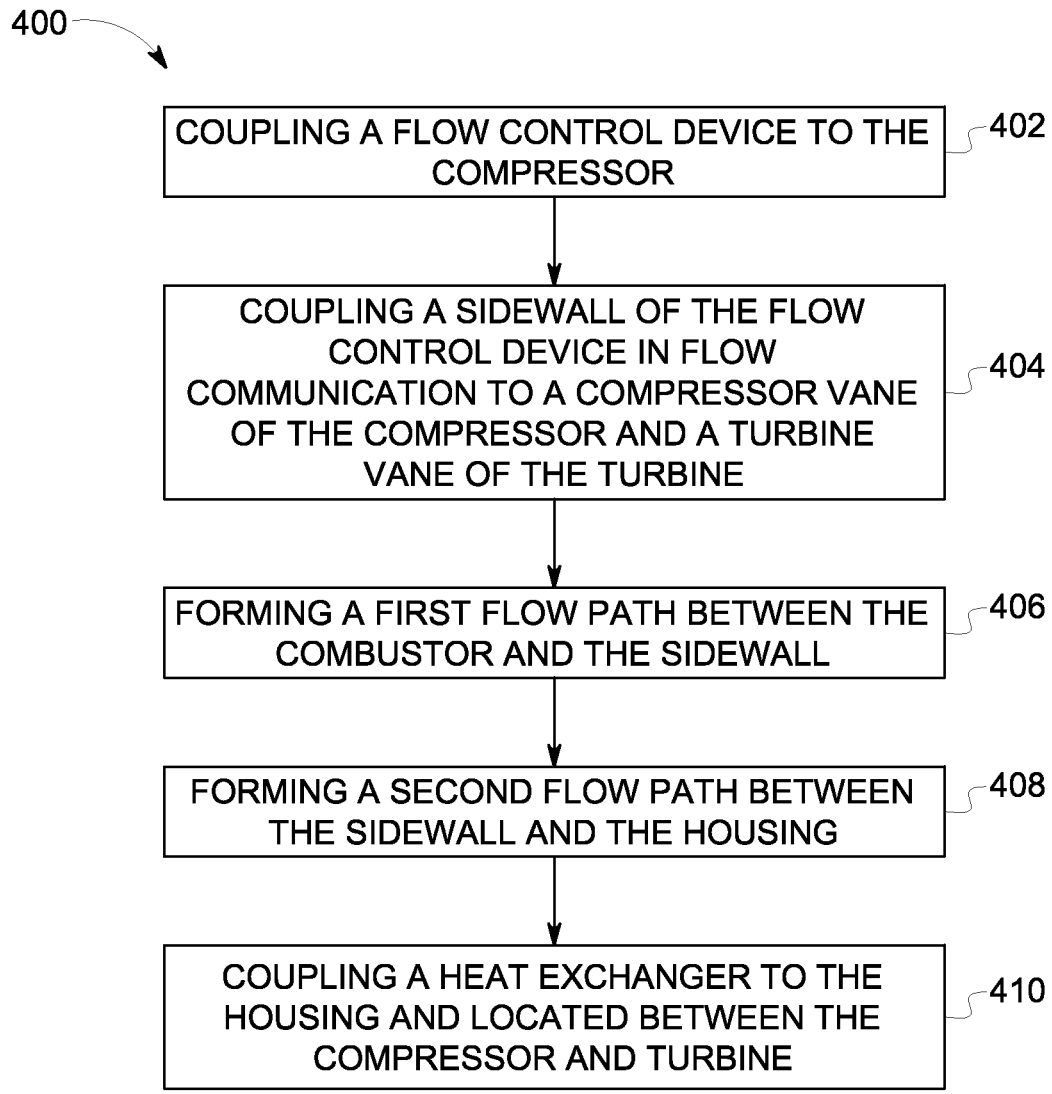
FIG. 4 is an exemplary flowchart illustrating a method of assembling a heat transfer assembly.

FIG. 4 is an exemplary flowchart illustrating a method 400 of assembling a heat transfer, such as heat transfer assembly 102 (shown in FIG. 2), to a turbine engine, for example turbine engine 100 (shown in FIG. 1). Turbine engine includes a housing, for example housing 103 (shown in FIG. 1), and a compressor, for example compressor 104 (shown in FIG. 1), a turbine, for example turbine 106 (shown in FIG. 1), and a combustor, for example combustor 110 (shown in FIG. 1), located within housing. Method 400 includes coupling 402 a flow control device, such as flow control device 160 (shown in FIG. 1), to the turbine. More particularly, method 400 includes coupling 404 a sidewall, for example sidewall 164 (shown in FIG. 1), of the flow control device to a compressor vane, for example compressor vane 120 (shown in FIG. 2), and to a turbine vane, such as turbine vane 140 (shown in FIG. 2), of the turbine.

Method 400 further includes forming 406 a first flow path, for example first flow path 172 (shown in FIG. 3), between the combustor and the sidewall. A second flow path, such as second flow path 174 (shown in FIG. 3), is formed 408 between the sidewall and the housing. Method 400 further includes coupling 410 a heat exchanger, such as heat exchanger 162 (shown in FIG. 3), to the housing and located between the compressor and turbine. In the exemplary method 400, coupling the heat exchanger to the housing includes locating the heat exchanger within the second flow path. Method 400 further includes coupling a fluid supply device, for example fluid supply device 200 (shown in FIG. 3), to the heat exchanger and the combustor.

A technical effect of the systems and methods described herein includes at least one of: (a) extracting air flow from a compressor vane of a gas turbine engine; (b) reducing required space and equipment, installation, maintenance and/or operational costs of the gas turbine engine by locating a heat exchanger within the housing of a gas turbine engine to (c) directing the extracted air through the heat exchanger; (d) cooling the turbine blade with the extracted air; (e) maintaining desired temperatures of the turbine blade; and (f) increasing efficiency and reducing fuel consumption of a gas turbine engine.

The exemplary embodiments described herein facilitate increasing efficiency and reducing fuel consumption for a gas turbine engine. More particularly, the exemplary embodiments are configured to use bleed air that is extracted from the compressor and directed to cool turbine components. Moreover, the embodiments described herein use a lesser amount of bleed air to cool turbine components which increases a firing temperature of the combustor. Still further, the exemplary embodiments increase efficiency and reduce operating and maintenance costs associated with the turbine engine.

Compressor extraction may be provided in any compressor stage of a turbine system. The extracted flow may be supplied to the turbine section of the engine to cool parts and/or maintain the parts at appropriate temperatures during operation. For the embodiments described herein, extracted flow includes fluid medium such as, for example, air that is extracted or bled from the compressor and fed to the turbine section of the engine to cool parts, purge cavities or other similar uses. A heat exchanger is located within the housing of the gas turbine engine to reduce required space and equipment, installation, maintenance and/or operational costs. In the embodiments described herein, controller is configured to control and manipulate extraction flows existing multi-parameter turbine engine control system (e.g., existing model-based control systems or corrected parameter control systems) and/or for new turbine engine control systems.

The embodiments described herein utilize variable compressor extraction control and model-based control for improving operation of a combustion or gas turbine engine. Variable compressor extraction includes the ability to control the amount of airflow being extracted from the compressor section of a gas turbine. Model-based control includes a method of controlling a turbine engine based upon a model of engine operation. As such, a turbine engine may be controlled not only on measured operating parameters, but also on operating parameters that may be calculated given the turbine engine model and the measured operating parameters. The embodiments described herein enhance operational performance through, among other things, the integration of variable compressor extraction and model-based control.

Exemplary embodiments of a heat transfer assembly and turbine engine and methods for assembling the flow control device are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many other engine applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat transfer assembly for controlling heat transfer of a turbine engine having a housing and having a compressor, a combustor and a turbine located within the housing, the compressor having a compressor vane and the turbine having a turbine vane and a turbine blade, said heat transfer assembly comprising:
a flow control device comprising a sidewall coupled to the turbine and in flow communication with the compressor vane, said sidewall configured to define a first flow path from the compressor vane to the turbine vane and a second flow path from the compressor vane to the turbine blade;
a heat exchanger coupled to the housing and located between the compressor and the turbine, said heat exchanger in flow communication with at least one of said first flow path and said second flow path, wherein said heat exchanger is coupled to the housing and inboard of the combustor; and
a fluid supply device coupled to said housing and comprising an inlet and an outlet, said inlet and outlet coupled to said heat exchanger in flow communication and configured to direct a cooling fluid through said heat exchanger.

2. The heat transfer assembly of claim 1, wherein said first flow path is in flow communication with the compressor vane.

3. The heat transfer assembly of claim 1, wherein said first flow path is in flow communication with the turbine vane.

4. The heat transfer assembly of claim 1, wherein said second flow path is in flow communication with the compressor vane.

5. The heat transfer assembly of claim 1, wherein said second flow path is in flow communication with the turbine blade.

6. The heat transfer assembly of claim 1, wherein said heat exchanger is located within said second flow path.

7. The heat transfer assembly of claim 1, wherein said heat exchanger comprises a plurality of heat fins positioned within said second flow path.

8. The heat transfer assembly of claim 1, wherein said heat exchanger is coupled in flow communication to the compressor vane.

9. The heat transfer assembly of claim 1, wherein said sidewall is located between said combustor and said heat exchanger.

10. A turbine engine comprising:
- a compressor comprising an exit guide vane comprising an inlet end, an outlet end and a mid-span portion located there between;
- a turbine coupled to said compressor and comprising a turbine vane and a turbine blade;
- a combustor coupled to said compressor and said turbine; and
- a heat transfer assembly coupled to said compressor and said turbine, said heat transfer assembly comprising:
  - a flow control device comprising a sidewall coupled to said turbine and in flow communication with said exit guide vane, said sidewall configured to define a first flow path from said exit guide vane to said turbine vane and a second flow path from said compressor vane to said turbine blade; and
  - a heat exchanger coupled to a housing of the turbine engine and located between said compressor and said turbine and inboard of the combustor, said heat exchanger in flow communication with said exit guide vane and at least one of said first flow path and said second flow path.

11. The turbine engine of claim 10, wherein said sidewall is located between said combustor and said heat exchanger.

12. The turbine engine of claim 10, wherein said heat exchanger is coupled to said compressor and said turbine and adjacent to said combustor.

13. The turbine engine of claim 10, wherein said first flow path is configured to direct a compressor bleed air from said compressor and in flow communication with said turbine vane.

14. The turbine engine of claim 10, wherein said second flow path is configured to direct a compressor bleed air from said heat exchanger and in flow communication with said turbine blade.

15. The turbine engine of claim 10, further comprising a fluid supply device coupled to said heat exchanger and comprising an inlet and an outlet, said inlet and outlet are coupled in flow communication to said heat exchanger and configured to direct a cooling fluid through said heat exchanger.

16. The turbine engine of claim 15, wherein said outlet is coupled in flow communication to said combustor.

17. A method of assembling a heat transfer assembly to a turbine engine comprising a compressor and a turbine, said method comprising:
- coupling a flow control device to the turbine;
- coupling a sidewall of the flow control device in flow communication to a compressor vane of the compressor and a turbine vane of the turbine;
- forming a first flow path between the combustor and the sidewall;
- forming a second flow path between the sidewall and the housing; and
- coupling a heat exchanger to a housing and located between a compressor and the turbine and inboard of the combustor.

18. The method of claim 17, wherein coupling the heat exchanger to the housing includes locating the heat exchanger within the second flow path.

19. The method of claim 17, further comprising coupling a fluid supply device to the heat exchanger and the combustor.

* * * * *